United States Patent [19]

Ganser

[11] Patent Number: 5,577,667

[45] Date of Patent: Nov. 26, 1996

[54] FUEL INJECTION VALVE

[75] Inventor: Marco A. Ganser, Zurich, Switzerland

[73] Assignee: Ganser-Hydromag, Zurich, Switzerland

[21] Appl. No.: 507,961

[22] Filed: Jul. 27, 1995

Related U.S. Application Data

[62] Division of Ser. No. 172,298, Dec. 23, 1993, Pat. No. 5,458,293.

[30] Foreign Application Priority Data

Dec. 23, 1992 [CH] Switzerland ................ 914/92

[51] Int. Cl.$^6$ .................................... F02M 51/00
[52] U.S. Cl. ........................ 239/533.8; 239/585.1
[58] Field of Search ................ 239/533.8, 533.9, 239/88–92, 585.1–585.5

[56] References Cited

U.S. PATENT DOCUMENTS

| | | |
|---|---|---|
| 3,610,529 | 10/1971 | Huber . |
| 3,831,863 | 6/1974 | Fenne .................. 239/533.8 |
| 4,516,730 | 5/1985 | Füssner . |
| 4,545,352 | 10/1985 | Jourde et al. . |
| 4,566,416 | 1/1986 | Berchtold . |
| 4,684,067 | 8/1987 | Cotter et al. . |
| 4,768,719 | 9/1988 | Straubel et al. . |
| 4,934,599 | 6/1990 | Hasagawa . |
| 4,946,106 | 8/1990 | Turchi et al. .......... 239/533.8 X |
| 4,972,999 | 11/1990 | Filippi ................ 239/533.8 X |
| 5,072,882 | 12/1991 | Taue et al. ................. 239/88 |
| 5,156,132 | 10/1992 | Iwanaga . |
| 5,165,607 | 11/1992 | Stevens . |

*Primary Examiner*—Kevin Weldon
*Attorney, Agent, or Firm*—Lowe, Price, LeBlanc & Becker

[57] ABSTRACT

A fuel injection valve for intermittent fuel injection into a combustion space of a combustion engine comprises an injection valve indirectly actuated electromagnetically by a hydraulic amplifier. The opening motion of the injection valve element remains limited at low and medium injection pressure, while the opening motion of the injection valve element is substantially more rapid and the opening path of the injection valve element substantially larger at high injection pressure than it is at low to medium injection pressure. It is possible to operate the engine over the complete load and rotational speed range under optimum injection conditions.

11 Claims, 4 Drawing Sheets

FUEL INJECTION VALVE

This application is a division of application Ser. No. 08/172,298 filed Dec. 23, 1993 now U.S. Pat. No. 5,458,293.

FIELD OF APPLICATION

The present invention relates to a fuel injection valve for use in an injection system for internal combustion engines. Such a fuel injection valve is particularly suitable for direct injection of the fuel into the combustion space of each cylinder of the internal combustion engine and can be used with advantage in diesel engines.

BACKGROUND OF THE INVENTION

Fuel injection valves of this type with indirect electromagnetic control of the nozzle needle of the fuel injection valve are revealed, for example, in the following publications:

U.S. Pat. No. 4,566,416, EP-A-0 228 578 and EP-A-0 262 539.

In the fuel injection valves revealed in the publications quoted above and in the fuel injection valve of the present invention, the nozzle needle is indirectly actuated electromagnetically by means of a hydraulic amplifier. The fuel pressure in a control space acts on a needle piston and holds the nozzle needle closed. The control space is connected to the high-pressure supply conduit of the fuel injection valve via a first throttle hole and the control space can be relieved via a second throttle hole. The outlet from this second throttle hole can be opened and closed by an electromagnetically actuated pilot valve. If the pilot valve is actuated, the second throttle hole is opened. Because of the first throttle hole, the pressure in the control space drops. In consequence, a force occurs on the nozzle needle in the opening direction of the nozzle needle and injection begins. If the pilot valve is closed again, the pressure in the control space builds up again, the nozzle needle is closed and the injection is, in consequence, ended. Fuel injection valves of this type are therefore suitable for generating intermittent injections such as are necessary, for example, in the case of diesel engines.

The maximum injection pressures of these injection valves can be more than 1000 bar. The minimum injection pressures vary between 100 and 300 bar. The engine is operated under load and up to full load by using the upper injection pressure range whereas the engine is operated at idle and at very low load in the lower pressure range.

In order to achieve good power and exhaust gas figures from the engine, the injection period must be short under load and at high rotational speed of the engine. This period is generally about one-thousandth of a second. The quantity injected at these operating points is substantially larger than that when the engine is idling. The fuel quantity required per working stroke at idle is, on the contrary, extremely small because it is only necessary to overcome the friction of the engine and there is no power output at the drive end of the crankshaft. In addition, the rotational speed of the engine is low. In order to avoid rough and noisy engine running at idle and at low load, it is desirable for the injection period to be relatively long, despite the small injection quantity. It should again, typically, be between one-thousandth and two-thousandths of a second.

Because the injection quantity is small, it is difficult to generate a long injection period with the fuel injection valves of known type and it is, in consequence, difficult to achieve quiet, smooth engine idling.

SUMMARY OF THE INVENTION

The object of the present invention is to propose a novel, improved fuel injection valve of simple design in which the opening motion of the injection valve element remains limited at low injection pressure (for example 200 bar) and medium injection pressure (for example between 300 and 500 bar) and a small injection quantity can therefore be injected during a long injection period whereas, at high injection pressure (for example 1000 bar or more), the opening motion of the injection valve is substantially more rapid and the opening path of the nozzle needle of the injection valve is substantially larger than at low to medium pressure and, therefore, a large injection quantity can be injected during a short injection period.

This makes it possible to achieve, in the first place, smooth running at idle and at low load and to satisfy, in the second place, the requirement for good power and exhaust gas figures under load and at high engine rotational speed.

The object is achieved by means of a novel fuel injection valve.

Because of the pressure drop in the control space, the nozzle needle of the fuel injection valve will only execute a first displacement or lift from the valve seat at low and medium injection pressures. This continues until a lift stop is reached which is preloaded by a strong spring and rests on a stop surface. The spring preloading force is sufficiently large for the lift stop not to be moved until a medium pressure level is reached. At high injection pressure, on the other hand, the pressure drop in the control space generates a force which is sufficiently large to move the lift stop and the nozzle needle so that there is a second lift range and, in consequence, a large injection quantity can be injected during a short injection period.

These and further advantages of the invention are explained by means of the following detailed description of different embodiment variants which are shown in the figures.

DETAILED DESCRIPTION OF THE PREFERRED EMBODIMENTS

Figure 1:
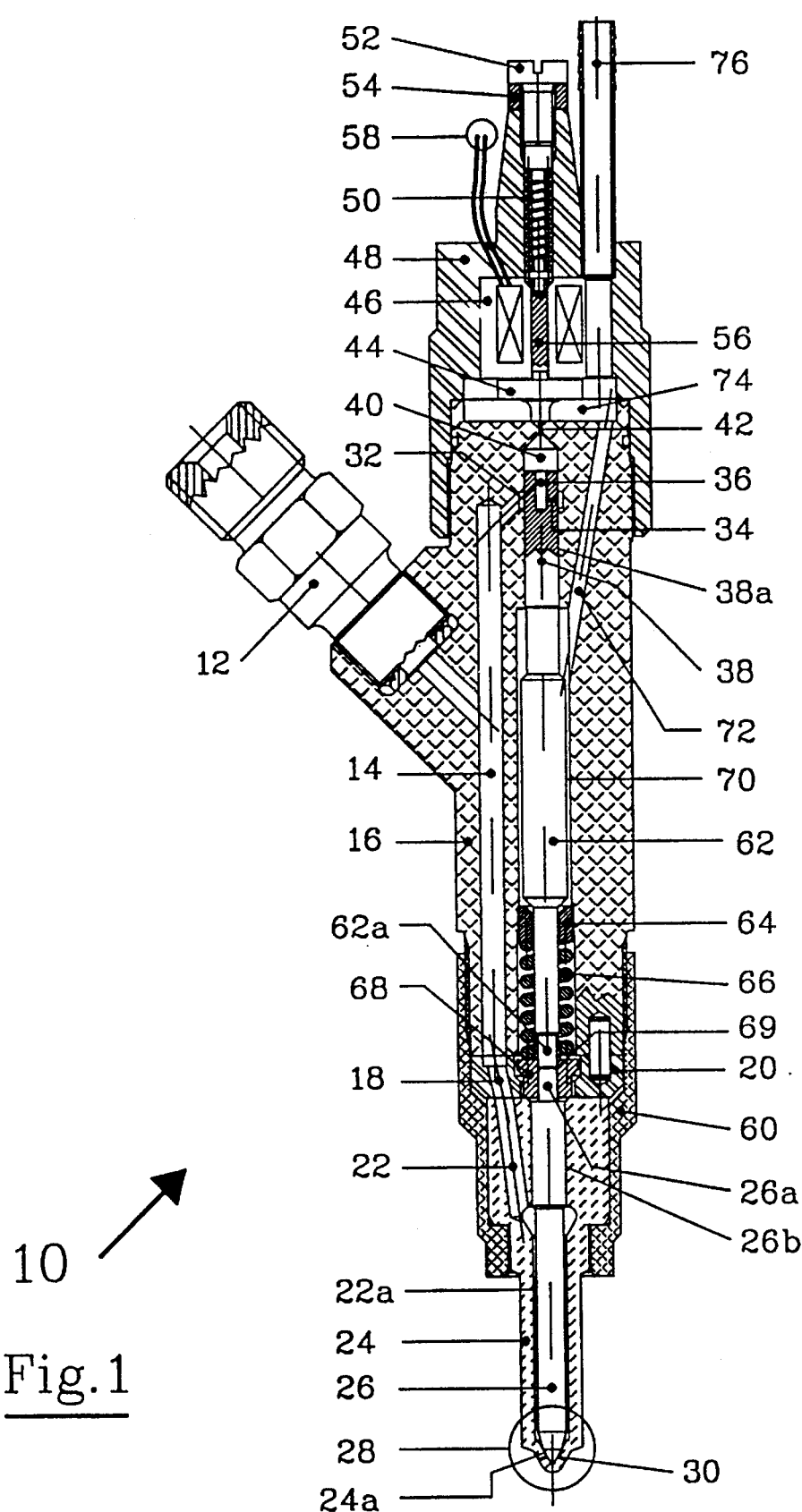
FIG. 1 is an axial sectional drawing of an electromagnetically controlled fuel injection valve according to the present invention.

Referring to FIG. 1, which shows a sectional drawing of a fuel injection valve 10 according to the present invention, the fuel under pressure reaches a longitudinal hole 14, which is introduced into the valve housing 16, via a supply connection 12. The hole 14 extends downwards as far as an intermediate plate 20 and opens into a hole 18 produced in the intermediate plate 20. The hole 18 opens into a hole 22 which is connected to an annular hole 22a which is located in the nozzle tip 24. The annular hole 22a extends in the nozzle tip 24 as far as the seat 24a of the atomizer nozzle 28, which is located between the nozzle tip 24 and the tip of the nozzle needle 26.

The atomizer nozzle 28 is embodied as a so-called seat-hole nozzle. In such an arrangement of the atomizer nozzle 28, the injection holes 30 open at the inside directly into the seat 24a, which is closed by the nozzle needle tip when no injection is to take place. This arrangement has the specific advantage that, assuming there is a sufficient fuel pressure in the annular hole 22a, the atomizer nozzle 28 generates good atomization in the combustion space of the associated internal combustion engine (not shown) even at a very small lift of the nozzle needle 26. As mentioned above, this has a favourable effect on the operating behaviour of the engine.

In FIG. 1, the seat-hole nozzle is shown as an example of an atomizer nozzle 28 which has good fuel atomization even at very small lift of the nozzle needle 26. Further arrangements of the atomizer nozzle 28 can be used in association with the present invention. In order to utilize the advantages of the present invention in an optimum manner, however, it is expedient to use atomizer nozzles which ensure good conversion of the pressure energy in order to generate small, finely distributed fuel droplets in the combustion space of the engine even at very small lift of the nozzle needle.

The hole 14 extends upwards as far as an annular groove 32 which is connected to the control space 40 by means of the throttle hole 34 and a longitudinal hole 36, both produced in the needle piston 38. A second throttle hole 42 opens at one end into the control space 40. At the other end, the throttle hole 42 is held closed by an electromagnetically actuated pilot needle 44. The pilot needle 44 can be moved away from the outlet end of the throttle hole 42 by means of the electromagnet 46.

The magnet 46 is screwed to the valve housing 16 by means of a nut 48. A control spring 50, a control spring screw 52 and a control spring sleeve 54 are also visible in FIG. 1. The stem 56 of the pilot needle 44 is guided within the magnet 46 on the longitudinal axis of the injection valve 10. The return force of the control spring 50 acts on the upper end of the stem 56 of the pilot needle 44. This force can be set to the desired value by selecting the thickness of the spring sleeve 54. The electromagnet 46 is supplied with electrical current pulses of a predetermined duration by means of the electrical connecting cable 58.

The nozzle tip 24 is screwed, together with the intermediate plate 20, in a sealed manner onto the valve housing 16 by means of a union nut 60. At its upper end, the nozzle needle 26 has a thin extension 26a and the lower extension 62a of the needle plunger 62 presses on the end of this thin extension 26a. The needle plunger 62 has, at its upper end, the needle piston 38, already mentioned, and is connected to this needle piston 38 as an integral part.

The needle piston 38, together with the valve housing 16, has a guide 38a with a closely toleranced sliding fit. The clearance of this sliding fit is typically 2–4 microns. The nozzle needle 26, together with the nozzle tip 24, likewise has a guide with a close sliding fit 26b. The clearance of this close guide is also typically 2–4 microns. Between these two guides 26b and 38a, there is a space 70 in which the pressure is substantially lower than that in the fuel passages previously mentioned. This space 70 is connected via a hole 72 in the valve housing 16 to a further space 74 in which the pilot needle 44 is located. Leakage fuel which reaches the space 70 from the control space 40 via the guide 38a and from the annular hole 22a via the guide 26b is evacuated into the space 74 through the hole 72. This fuel, together with the fuel which is relieved into the space 74 by the throttle hole 42 during each injection, flows from the space 74 back to the fuel tank (not shown) via a drain nipple 76.

A needle spring washer 64, a needle spring 66 and a lift stop element 68 can also be seen in the lower part of the valve housing 16. The preloading force of the needle spring 66 can be brought to a desired value by selecting the thickness of the needle spring washer 64.

Figure 2:
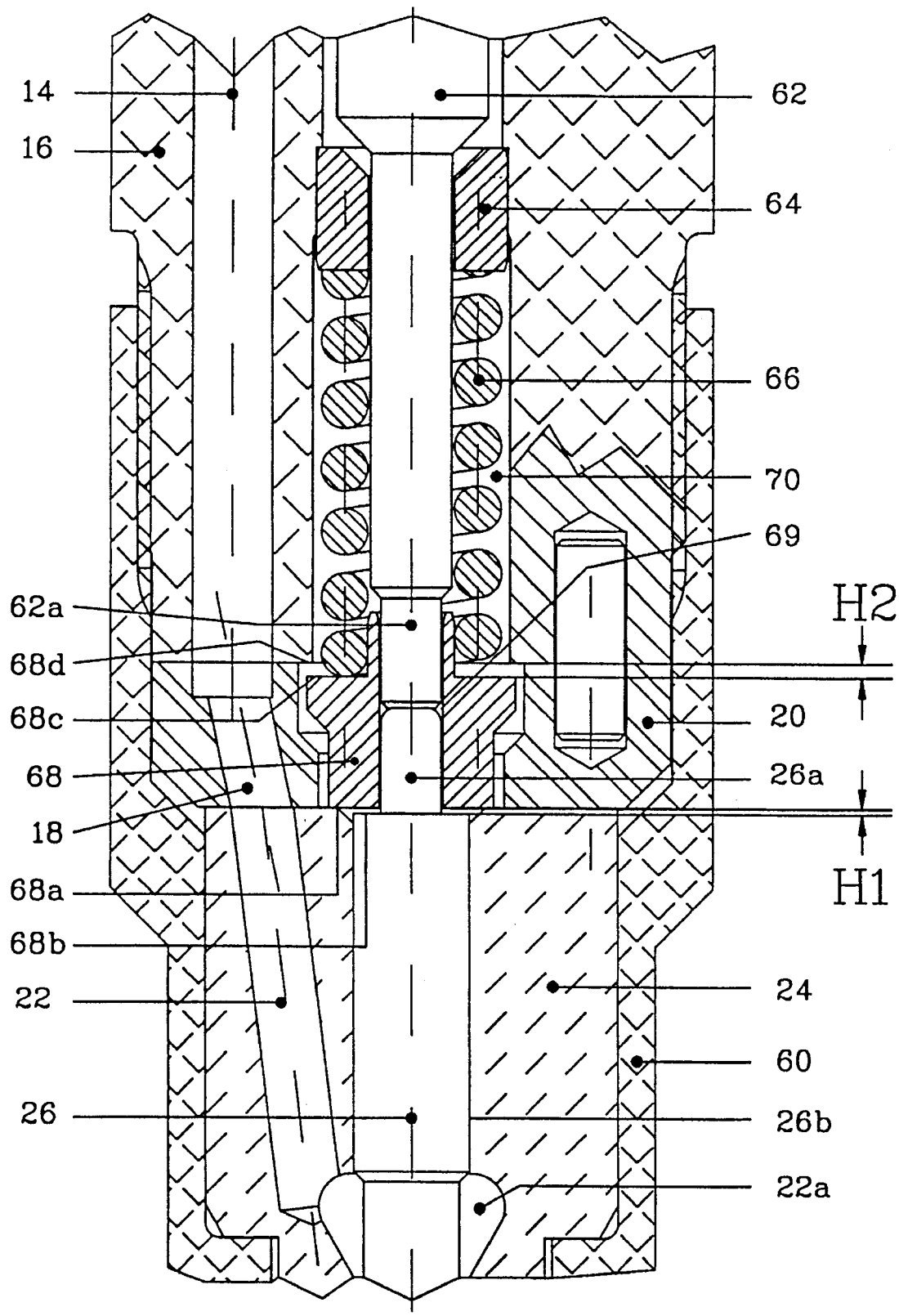
FIG. 2 is an enlarged partial excerpt from FIG. 1 which shows, in detail, the specific features for realizing the desired lift curve.

The elements just described and further elements, which have been described earlier, of the fuel injection valve 10 are likewise shown in FIG. 2. FIG. 2 is an enlarged, partial excerpt from FIG. 1 which shows, in detail, the specific features for realizing the desired lift curve during the injection in accordance with the present invention.

If no injection occurs, i.e. in the closed condition of the nozzle needle 26 as shown in FIGS. 1 and 2, the lift stop element 68 is in contact with a stop surface 68a. Between this plane, lower stop surface 68a of the lift stop element 68 and the upper, plane surface 68b of the nozzle needle 26, there is a first free path H1 (see FIG. 2).

The extension 62a of the needle plunger 62 presses, because of the pressure in the control space 40, on the extension 26a of the nozzle needle 26 and therefore holds the latter reliably in its closed position on the valve seat 24a. The extension 62a could also extend as far as the upper, plane surface 68b of the nozzle needle 26. This would dispense with the extension 26a of the nozzle needle 26.

A second free path H2 is present between the upper, plane stop surface 68c of the lift stop element 68 and the associated surface 68d of the valve housing 16.

The mode of operation of the fuel injection valve 10 is now as follows in the case of low (for example 200 bar) and medium (for example 400 bar) pressure level. In this operating condition, which is the defining one for idling and low engine load, the nozzle needle 26 will traverse only a lift equal to the path H1 during the total injection procedure. For this purpose, the electromagnet 46 is excited, at a desired instant, by a current pulse of specified duration. The pilot needle 44 is moved away from the throttle hole 42 against the force of the control spring 50. In consequence, and because of the throttle 34, the pressure in the control space 40 drops rapidly. The pressure in the annular space 22a, which acts on the guide piston 26b of the nozzle needle 26, is now capable of opening the nozzle needle 26 so that injection begins.

The extensions 26a and 62a then move within the longitudinal hole 69, which is arranged on the longitudinal axis of the fuel injection valve 10, of the lift stop element 68. The lift stop element 68 is, on the other hand, in contact with the lower stop surface 68a.

After the nozzle needle 26 has traversed the first path or lift H1, the stop 68b comes into contact with the stop 68a. The force of the spring 66 is sufficiently large to ensure that the hydraulic pressure force, which tends to open the nozzle needle 26 further, is not sufficient to overcome this spring force. The nozzle needle 26 will therefore only execute the first lift H1.

In the case of this small first lift H1, the effective flow area of the injection holes 30 is restricted so that a small injection quantity is supplied to the engine combustion space (not shown) during a long injection period. If the current pulse to the electromagnet 46 is ended, the pilot needle 44 is pushed back by the control spring 50 onto the throttle hole 42 and closes the latter. The pressure builds up in the control space 40 and the hydraulic pressure force in the control space 40 will now close the nozzle needle 26 and end the injection.

Figure 4A:
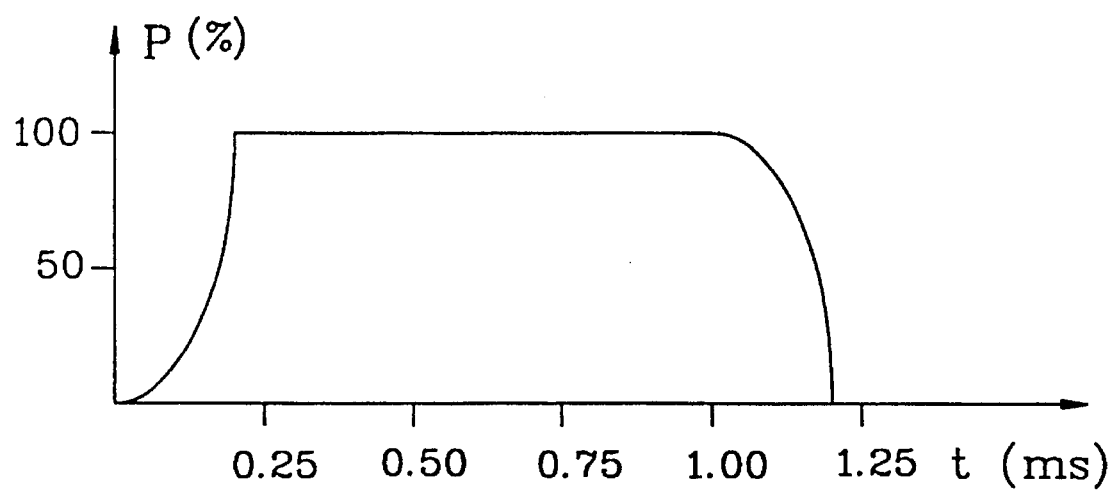
Figure 4B:
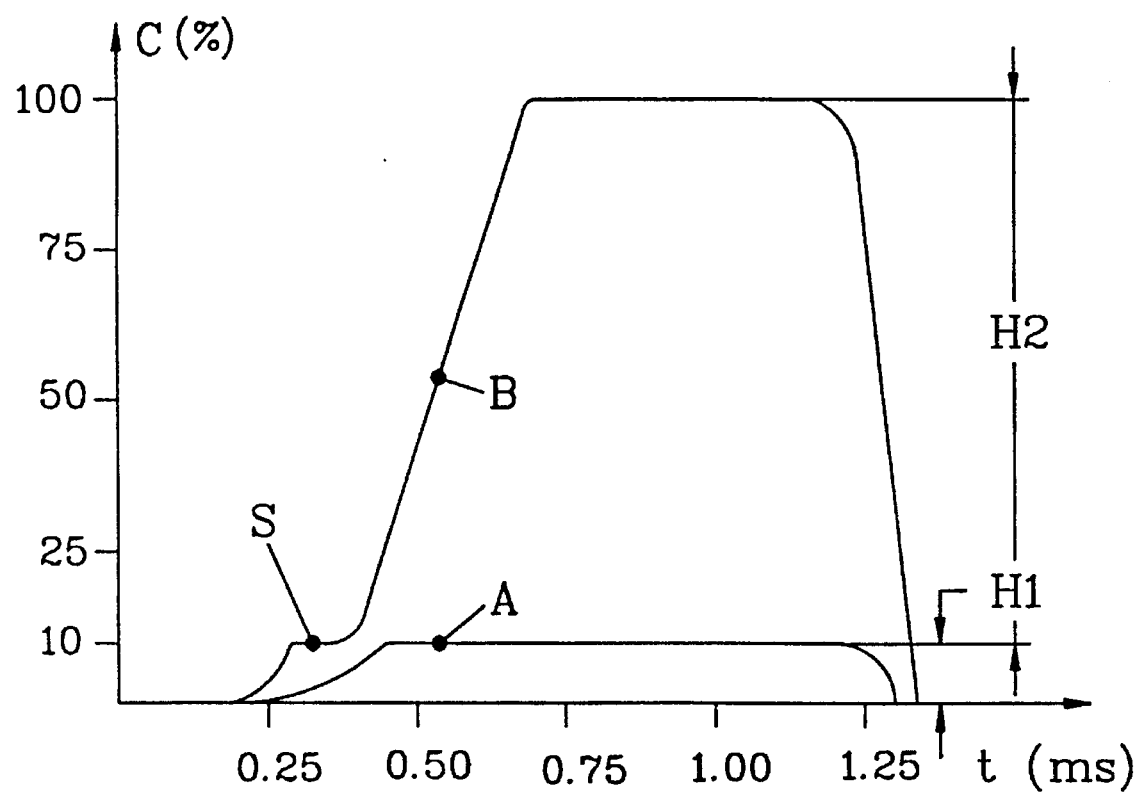

The curve of the first lift H1 of the nozzle needle 26 is shown in FIG. 4 as the ordinate C as a function of time t (curve A).

At high injection pressure (for example 1000 bar), the fundamental mode of operation of the fuel injection valve 10 is similar to that at low and medium injection pressure. In this case, it must be noted that the hydraulic pressure force, which acts in the opening direction of the nozzle needle 26 because of pressure drop in the control space 40, also increases as the injection pressure increases.

If the electromagnet 46 is excited with a current pulse of specified duration at high injection pressure (for example 1000 bar), the pilot needle 44 again moves away from the throttle hole 42 so that the pressure in the control space 40 drops. The nozzle needle 26 is opened by the hydraulic pressure force and rapidly traverses the first lift H1. After the plane surfaces 68b and 68a come into contact, the larger hydraulic pressure force is now capable of moving the lift stop element 68 against the force of the spring 66 until the stop surface 68c touches the surface 68d of the valve housing 16 so that the second, larger lift H2 is traversed in addition to the first lift H1.

If the current pulse to the electromagnet 46 is ended and, in consequence, the pressure in the control space 40 builds up anew after the closing of the throttle hole 42 by the pilot needle 44, the pressure force in the control space 40, together with the spring force of the spring 66, will rapidly close the nozzle needle 26. By this means, the injection is rapidly interrupted and this, in turn, has favourable effects on the engine operational figures.

The curve thus described of the nozzle needle motion during the injection is represented by the curve B in FIG. 4.

The variation with time of the pilot needle lift P after excitation of the electromagnet 46 is shown in FIG. 4. The pilot needle 44 rapidly traverses its lift as far as the stop at the electromagnet end and then remains open until a time of approximately 1 ms has elapsed. At this instant, the current pulse (not shown) is interrupted and the pilot needle 44 will be rapidly pushed back by the control spring 50 onto its seat at the outlet from the throttle hole 42.

The curves A and B of the nozzle needle motion, as described further above, are shown in the lower diagram of FIG. 4. In the case of the curve A, the nozzle needle 26 traverses the first lift H1, which in this diagram corresponds to 10% of the maximum nozzle needle lift, which is given by the addition of the two lifts H1 and H2. This value of 10% is a guideline value. Depending on the specific engine application, the first lift H1 can be of different magnitude compared with the second lift H2.

After traversing the first lift H1, the curve B has a step S. This step results from the fact that the nozzle needle 26 is initially retarded when the stop surface 68b comes in contact with the stop surface 68a. The nozzle needle 26, together with the plunger 62, the stop piece 68 and the lower part of the spring 66, must subsequently be accelerated anew.

This step S is not a disadvantage with respect to the combustion in the engine. On the contrary, it can lead to an improvement in the combustion and the associated noise and exhaust gas emissions of the engine in certain applications. The step S just mentioned will be more or less marked depending on how large the masses of the nozzle needle 26, the needle plunger 62 and the lift stop element 68 are and on how rapidly the pressure drop in the control space 40 takes place and how large it is. In certain cases, this step S can be very short so that the transition from the first lift H1 to the second lift H2 is only noticeable as a kink in the opening motion of the nozzle needle 26. Depending on the operating pressure of the fuel injection valve 10, the slope or opening rate of the second lift H2 is equal to zero (curve A), equal to a curve between A and B or equal to a curve as at B (see FIG. 4).

After the step mentioned, the nozzle needle 26, together with the plunger 62, the stop piece 68 and the lower part of the spring 66, moves further and traverses the second lift H2 until the second, definitive lift stop 68d of the valve housing 16 is reached. The total lift therefore traversed by the nozzle needle 26 corresponds to the sum of the two partial lifts H1 and H2.

A further advantage of the present invention, in addition to achieving the curve A at low operating pressure and the curve B at high operating pressure of the fuel injection valve 10, is the fact that the curves of the nozzle needle opening motion of the second lift H2 between A and B for different operating pressures can be realized in a substantially more flexible and exact manner than in the case of the already known fuel injection valves of this type (such as those of EP-A-0 228 578 or EP-A-0 262 539 for example).

In the case of the present invention, the opening rate of the second lift H2 of the nozzle needle 26 can take on any given value between the curves A and B, depending on the operating pressure. This is the case because the nozzle needle 26 has executed the first lift H1 even at low operating pressure (for example 200 bar) and the fuel pressure acts on the seat surface 24a, and therefore the tip of the nozzle needle 26. In this condition, the hydraulic pressure forces which act from the nozzle tip 24 end on the nozzle needle 26 and from the control space 40 end on the plunger 62 are stable. It is therefore possible to achieve any given opening rate of the second lift H2 of the nozzle needle 26 in a stable and reproducible manner.

In the already known solutions where only one lift is traversed without an intermediate lift stop, the pressure in the control space must be greatly reduced at an already extremely high operating pressure of the fuel injection valve in order to balance the force of the closing spring and the missing pressure force of the valve, which is still closed. If the nozzle needle now opens and if the hydraulic seat force becomes effective under the nozzle tip, the nozzle needle traverses its lift very rapidly and it is not possible to control the opening rate.

It should also be noted that the fuel pressure at which the nozzle needle 26 is in a position to move the lift stop element 68 by the amount of the second lift H2 can be of different magnitude depending on the specific application (for example 200, 300, 400 or 500 bar). This is achieved by the specific matching of the control elements (for example, the force of the spring 66).

Figures 3, 3A, 3B:
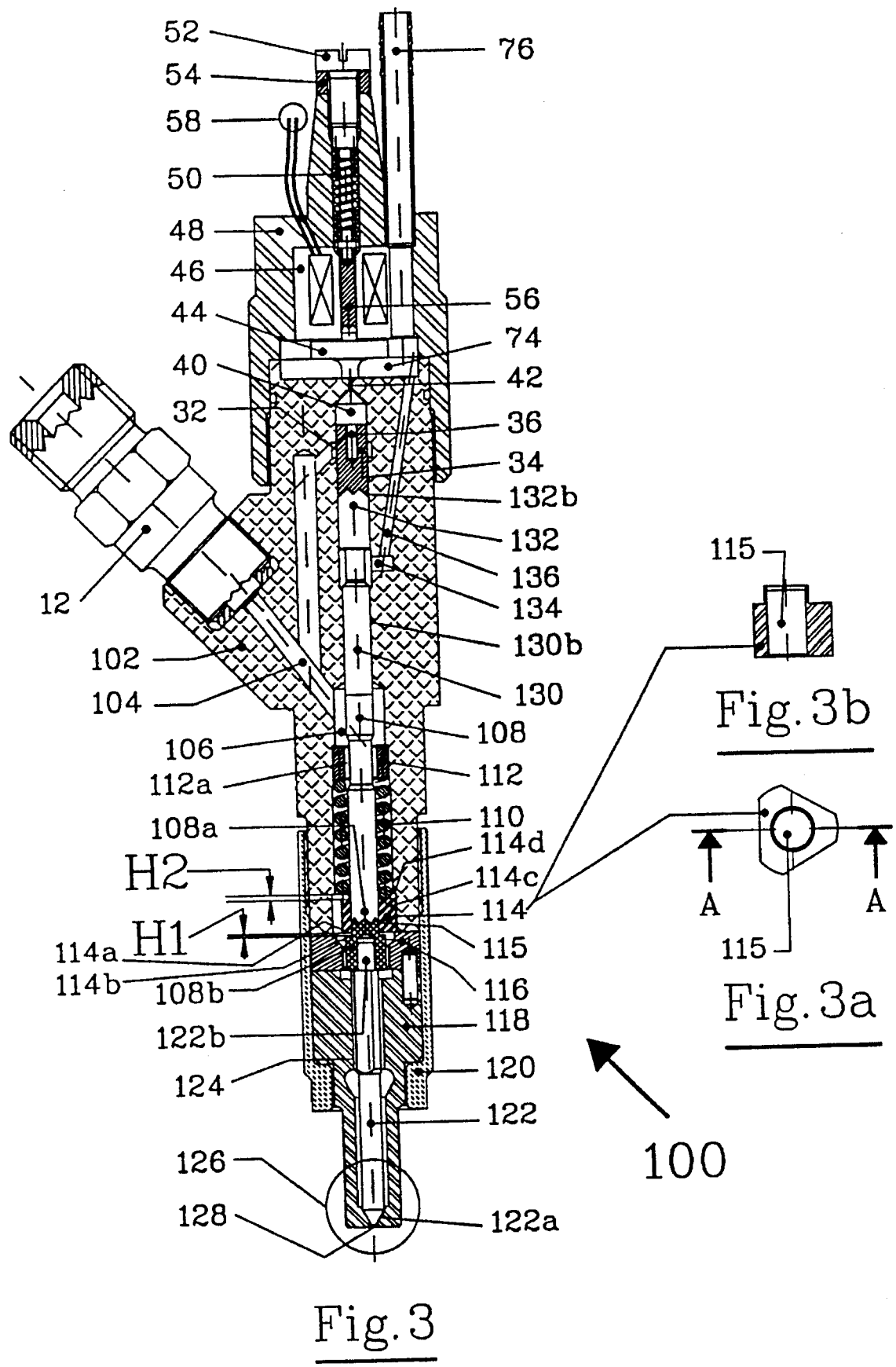
FIG. 3 is an axial sectional drawing of a second embodiment variant of a fuel injection valve according to the present invention.
FIG. 3a is an enlarged view from above of a lift stop element of the fuel injection valve of FIG. 3.
FIG. 3b is a sectional drawing of the lift stop element along the line A—A of FIG. 3a and FIGS. 4a and 4b are a diagram which shows the shapes of the lift curves of the fuel injection valves of the present invention for relatively low to medium injection pressure and for high injection pressure.

FIG. 3 shows an axial sectional drawing of a second embodiment of a fuel injection valve 100 according to the present invention. The elements of the fuel injection valves 10 and 100, which are the same, have been given the same numbers.

The fuel under pressure reaches the valve housing 102 via the supply connection 12 and a hole 104.

The hole 104 is connected to a hole 106 introduced on the longitudinal axis of the fuel injection valve 100. An intermediate piece of the needle plunger 108, a spring 110, a spring washer 112 and a lift stop element 114 are located in this hole 106.

An intermediate plate 116 is located between the lower end of the valve housing 102 and the nozzle tip 118. The nozzle tip 118 and the intermediate plate 116 are screwed onto the valve housing 102 in a sealed manner by means of a union nut 120. The nozzle needle 122 is guided in the nozzle tip 118 by means of a nozzle needle guide 124. The nozzle tip 118 and the nozzle needle 122 have an atomizer nozzle 126 with a common valve seat 122a and a single injection hole 128. Like the atomizer nozzle of the fuel injection valve 10, this arrangement of the atomizer nozzle 126 also permits optimum utilization of the properties of the present invention.

As shown in FIG. 3, the lower part 108b of the needle plunger 108 is connected to the extension 122b of the nozzle needle 122 by means of a press fit. In contrast to the fuel injection valve 10, a fixed mechanical connection between the needle plunger 108 and the nozzle needle 122 is necessary in this case because otherwise the nozzle needle 122 would not open. An alternative embodiment would be one in which both parts are welded or brazed together or in which both the nozzle needle 122 and the needle plunger 108 are manufactured from one workpiece.

In a further alternative variant, not shown in any more detail, the plate 116 could be omitted and the valve housing 122 could be embodied as far as the nozzle tip 118.

As compared with the fuel injection valve 10, as shown in FIGS. 1 and 2, the embodiment of the fuel injection valve 100 with the space 106 which is at high pressure has the advantage that the lower part of the fuel injection valve 100 can be made substantially thinner than is possible in the case of the fuel injection valve 10 because there is no need for a fuel supply hole 14 to the side of the fuel injection valve longitudinal axis.

In the case of the fuel injection valve 100, all the elements within the hole 106 and inside the nozzle tip 118 and the plate 116 are embodied in such a way that there is a connection without hydraulic resistance between the end of the hole 104 and the atomizer nozzle 126. This is realized by means of a passage 112a between the spring washer 112 and the needle plunger 108 and by means of a plurality (three in each case here) of flats which are applied to the periphery of the lift stop element 114 and the nozzle needle guide 124. The view from above of the lift stop element 114 is shown in FIG. 3a for better illustration of the embodiment of these flats. In addition, a section A—A of the lift stop element 114, in accordance with FIG. 3a (the same as in the fuel injection valve 100) is shown enlarged in FIG. 3b. The hydraulic through-flow area of the passage 112a and the flats is substantially larger than the through-flow area of the injection hole 128. Further alternative embodiments can also be realized.

The plunger 108 has at its upper end an integral plunger piston 130 having a close sliding fit 130b with the valve housing 102. It should also be noted that the nozzle needle 122, the plunger 108, the needle lift stop 114, the spring 110 and the spring washer 112 can be installed in the fuel injection valve 100 from underneath. This is a very simple arrangement.

A second needle piston 132 is guided inside the valve housing 102 with a close sliding fit 132b. The piston 132 now presses on the upper end of the plunger piston 130. The diameter of the second needle piston 132 can, as an option, be the same size as the diameter of the plunger piston 130 or, as is shown in FIG. 3, it can be slightly larger. This fact can also be taken into account in the fuel injection valve 10 by selecting the diameters of the pistons 26b and 38.

A space 134, which has a low pressure level, is formed between the piston 132 and the piston 130. A relief hole 136 connects this space 134 with the space 74. The significance of this space 134 and this hole 136 is the same as that of the space 70 and the hole 72 of the fuel injection valve 10.

The mode of operation of the fuel injection valve 100 is very similar to that of the fuel injection valve 10. It must be noted that the end of the nozzle needle guide 124 coincides exactly with the upper end of the nozzle tip 118 at the contact surface with the intermediate plate 116. The lower part 108b of the needle plunger 108 is now somewhat shorter than the intermediate plate 116 and, specifically, by precisely the amount of the first lift H1.

At low (for example 200 bar) and medium (for example 400 bar) pressure level, the nozzle needle 122 and the needle plunger 108, together with the piston 132, will therefore only move by the amount of the first lift H1 until the stop surface 114b comes into contact with the stop surface 114a of the stop piece 114. In consequence, only the first lift H1 is traversed in the case of low to medium injection pressure level because the hydraulic opening force or control force is not sufficient to overcome the force of the spring 110.

At high pressure level (for example 1000 bar) in the fuel injection valve 100, the nozzle needle 122, with plunger 108, will move the stop piece 114 further until the stop surface 114c of the contact piece 114 comes into contact with the associated surface 114d in the housing 102 so that the second lift H2 is traversed.

In the designs of the fuel injection valves 10 and 100, the motion of the first lift H1 of the nozzle needles 26 and 122 is controlled by hydraulic forces only. The hydraulic pressure force in the control space 40 ensures that the nozzle needle 26 or 122 closes the seat 24a or 122a in a sealed manner when no injection is to take place. This is always the case during operation of the engine. After the engine is stopped, the hydraulic pressure in the fuel injection valves drops after some time to ambient pressure (approximately 1 bar).

Before renewed starting of the engine, a small hydraulic pressure of approximately 50 bar must be generated in the injection valves because otherwise the compression pressure in the engine cylinder or cylinders could open the nozzle needle(s) 26 or 122 by the amount of the first lift H1. Because of the possibly dirty state of the seat 24a or 122a, the required sealing would be impaired under certain circumstances.

If, in the case of certain applications, the generation of this minimum pressure is not possible before the engine starts, it is advantageous to hold the nozzle needle 26 or 122 of the fuel injection valves 10 or 100 closed mechanically. This could, for example, take place by means of a weak spring acting on the nozzle needle 26 or 122, this spring generating a closing force corresponding to a pressure of approximately 50 bar on the surface of the seat 24a or 122a. Such a spring is approximately 3 to 10 times weaker than the lift stop spring 66 or 110 of each fuel injection valve 10 or 100 and does not therefore impair the function of the fuel injection valves 10 and 100 of the present invention.

I claim:

1. Fuel injection valve for intermittent fuel supply into the combustion chamber of an internal combustion engine, comprising:

a housing, a valve seat provided with at least one injection opening, an elongated injection valve element arranged within the housing for movement in the direction of the longitudinal axis of the housing and interacting with the valve seat for closing the injection opening, the injection valve element being temporarily movable in axial direction away from the valve seat in order to open the injection opening, a control chamber arranged within the housing which is connected on one hand to a high pressure region containing pressurized fuel and temporarily connectable on the other hand to a low pressure region via a control opening which is closed by means of an electromagnetically actuated pilot valve, the fuel pressure in the control chamber acting on the injection valve element, and pressing the latter onto the valve seat and the fuel pressure in the control chamber being dropped rapidly and built up again rapidly by actuating the electromagnetically actuated pilot valve to allow for the axial opening and closing motion of the injection valve element, a hole or bore provided in the injection valve element and extending in the longitudinal axis of the latter and opening into the control chamber, and a control or throttle hole also provided in the injection valve element opening into the hole or bore and being in connection with the high pressure region, said control or throttle hole having a smaller diameter than the hole or bore.

2. Fuel injection valve according to claim 1, comprising an annular groove connected to the high pressure region, the control or throttle hole connecting the annular groove with the hole or bore.

3. Fuel injection valve according to claim 1, wherein the injection valve element consists of at least a first partial piece and a second partial piece, one end of the first partial piece acting together with the valve seat.

4. Fuel injection valve according to claim 3, wherein the second partial piece of the injection valve element is located in a longitudinal hole of the housing in which there is a low pressure level.

5. Fuel injection valve according to claim 6, wherein the first partial piece of the injection valve element is located in a longitudinal hole in the housing, in which there is a pressure equal to the injection pressure.

6. Fuel injection valve according to claim 3, wherein an extension of the second partial piece of the injection valve element contacts the first partial piece of the injection valve element.

7. Fuel injection valve according to claim 3, wherein the first partial piece of the injection valve element consists of two permanently interconnected parts.

8. Fuel injection valve according to claim 5, wherein the injection valve element has a further, third partial piece which is guided in a first guide and in which the hole or bore and the control or throttle hole are arranged and, in addition, has a fourth partial piece which is guided in a further, second guide, an essentially non-pressurized space being arranged between these two guides, the third partial piece being pressed against the fourth partial piece by the pressure in the control space.

9. Fuel injection valve according to claim 1, wherein the injection valve element has a first piston element, which is biased by the pressure in the control chamber and a guide diameter larger than a guide diameter of a second piston element of the injection valve element, the hole or bore as well as the control or throttle hole being arranged in the first piston element.

10. Fuel injection valve according to claim 2, wherein the injection valve element has a first piston element, which is biased by the pressure in the control chamber and a guide diameter is larger than a guide diameter of a second piston element of the injection valve element, the hole or bore as well as the control or throttle hole being arranged in the first piston element, and the annular groove is arranged in the first piston element.

11. Fuel injection valve according to claim 9, comprising an annular groove connected to the high pressure region, the control or throttle hole connecting the annular groove with the hole or bore, wherein the annular groove is arranged in the first piston element.

* * * * *